US009491656B2

(12) United States Patent
Zhou et al.

(10) Patent No.: US 9,491,656 B2
(45) Date of Patent: Nov. 8, 2016

(54) METHOD FOR SELECTING BEARER MODE, PACKET GATEWAY, AND POLICY AND CHARGING RULE FUNCTION ENTITY

(71) Applicant: Huawei Technologies Co., Ltd., Shenzhen, Guangdong (CN)

(72) Inventors: Weihua Zhou, Shenzhen (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 14/313,722

(22) Filed: Jun. 24, 2014

(65) Prior Publication Data

US 2014/0307546 A1    Oct. 16, 2014

Related U.S. Application Data

(63) Continuation of application No. PCT/CN2012/088020, filed on Dec. 31, 2012.

(30) Foreign Application Priority Data

Dec. 31, 2011  (CN) .......................... 2011 1 0459687

(51) Int. Cl.
*H04L 12/26* (2006.01)
*H04W 28/02* (2009.01)
(Continued)

(52) U.S. Cl.
CPC ...... *H04W 28/0205* (2013.01); *H04L 41/0893* (2013.01); *H04W 76/02* (2013.01); *H04M 15/8044* (2013.01); *H04W 48/18* (2013.01)

(58) Field of Classification Search
CPC ................... H04W 28/0205; H04W 72/0406; H04W 76/023
USPC ................. 370/216–240, 310–350, 431–463
See application file for complete search history.

(56) References Cited

U.S. PATENT DOCUMENTS 7,177,943 B1    2/2007 Temoshenko et al.
7,593,686 B1    9/2009 Knoop
(Continued)

FOREIGN PATENT DOCUMENTS

CN    101068148 A    11/2007
CN    101207900 A    6/2008
(Continued)

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.0.0, pp. 1-287, 3$^{rd}$ Generation Partnership Project, Valbonne, France (Dec. 2011).
(Continued)

*Primary Examiner* — Ricky Ngo
*Assistant Examiner* — Wei-Po Kao
(74) *Attorney, Agent, or Firm* — Leydig, Voit & Mayer, Ltd.

(57) ABSTRACT

The present invention provides a method for selecting a bearer mode, a packet gateway, and a policy and charging rule function entity, relating to the field of communications technologies, and solving the problem that a base station selects a suitable air interface transmission mode for a bearer of a mobile terminal. Indication information of an air interface transmission mode supported by a mobile terminal is received. According to the indication information and a received enhanced policy and charging control rule that is sent by a policy and charging rule function entity, an air interface transmission mode allowed to be used by a bearer bound with a service flow of the mobile terminal is determined. A session establishment reply message is sent to a serving gateway to which the mobile terminal belongs, where the session establishment reply message comprises the air interface transmission mode allowed to be used by the bearer.

20 Claims, 11 Drawing Sheets

(51) Int. Cl.
*H04W 76/02* (2009.01)
*H04L 12/24* (2006.01)
*H04M 15/00* (2006.01)
*H04W 48/18* (2009.01)

(56) References Cited

U.S. PATENT DOCUMENTS

| | | |
|---|---|---|
| 2005/0157697 A1 | 7/2005 | Lee et al. |
| 2007/0297365 A1 | 12/2007 | Li et al. |
| 2009/0129283 A1 | 5/2009 | Kwon et al. |
| 2009/0264097 A1 | 10/2009 | Cai et al. |
| 2010/0182955 A1 | 7/2010 | Bjork et al. |
| 2010/0285827 A1 | 11/2010 | Kim et al. |
| 2011/0075675 A1* | 3/2011 | Koodli .................... H04L 12/14 370/401 |
| 2012/0064895 A1 | 3/2012 | Zhang et al. |
| 2012/0271958 A1* | 10/2012 | Oh .......................... H04L 12/14 709/228 |
| 2014/0233388 A1 | 8/2014 | Aramoto et al. |

FOREIGN PATENT DOCUMENTS

| | | |
|---|---|---|
| CN | 101374260 A | 2/2009 |
| CN | 101743767 A | 6/2010 |
| CN | 101841888 A | 9/2010 |
| CN | 102273263 A | 12/2011 |
| EP | 2547049 A1 | 1/2013 |
| WO | WO 2011147074 A1 | 12/2011 |

OTHER PUBLICATIONS

"3$^{rd}$ Generation Partnership Project; Technical Specification Group Core Network and Terminals; Policy and Charging Control (PCC) over Gx/Sd reference point (Release 11)," 3GPP TS 29.212, V11.3.0, pp. 1-171, 3$^{rd}$ Generation Partnership Project, Valbonne, France (Dec. 2011).

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.4.0, pp. 1-296, 3$^{rd}$ Generation Partnership Project, Valbonne, France (Dec. 2011).

* cited by examiner

METHOD FOR SELECTING BEARER MODE, PACKET GATEWAY, AND POLICY AND CHARGING RULE FUNCTION ENTITY

CROSS-REFERENCE TO RELATED APPLICATIONS

This application is a continuation of International Patent Application No. PCT/CN2012/088020, filed on Dec. 31, 2012, which claims priority to Chinese Patent Application No. 201110459687.1, filed on Dec. 31, 2011, both of which are hereby incorporated in their entireties.

TECHNICAL FIELD

The present invention relates to the field of communications technologies, and in particular, to a method for selecting a bearer mode, a packet gateway, and a policy and charging rule function entity.

BACKGROUND

With development of mobile communications technologies, data traffic transmitted in a network is increasingly large, which causes operation of the network to be maintained in a high load state for a long time. Therefore, an operator begins to use a Wi-Fi (wireless fidelity) mode to offload data traffic in a mobile data network, so as to reduce the load of the mobile network.

A UE (user equipment) may communicate with a base station to which the UE belongs in two communication modes, that is, a 3GPP (The 3rd generation partnership project) mode and the Wi-Fi mode, at the same time, and whether the 3GPP mode or the Wi-Fi mode is specifically selected is decided by the base station according to a load condition of each of the modes.

Specifically, the UE establishes two data transmission channels with the base station in the 3GPP mode and the Wi-Fi mode. The base station selects, according to load information of a 3GPP network and a Wi-Fi network, quality of an air interface link between the UE and the 3GPP network, quality of an air interface link between the UE and the Wi-Fi network, and QoS (quality of service) information of a relevant bearer of the UE, appropriate air interface transmission modes for different bearers of the UE to transmit data.

In the method for selecting a bearer mode, the base station may transmit, in the Wi-Fi mode, some service flows unsuitable to be transmitted in the Wi-Fi mode; the base station may also transmit service flows of some high-end users, or some service flows of a high-end user in the Wi-Fi mode without QoS guarantee. As a result, the base station selects an inappropriate air interface transmission mode for a relevant bearer of the UE because user experience is influenced.

SUMMARY

Embodiments of the present invention provides a method for selecting a bearer mode, a packet gateway, and a policy and charging rule function entity, which enable a base station to select an appropriate air interface transmission mode for a relevant bearer of a mobile terminal.

In a first aspect, a method for selecting a bearer mode is provided, including:

receiving indication information of an air interface transmission mode supported by a mobile terminal;

receiving an enhanced policy and charging control rule sent by a policy and charging rule function entity;

determining, according to the indication information and the enhanced policy and charging control rule, an air interface transmission mode allowed to be used by a bearer, where the bearer is bound with a service flow of the mobile terminal, and the enhanced policy and charging control rule comprises the service flow of the mobile terminal, and an air interface transmission mode allowed to be used by the service flow of the mobile terminal; and sending a session establishment reply message to a serving gateway to which the mobile terminal belongs, where the session establishment reply message comprises the air interface transmission mode allowed to be used by the bearer, so that the serving gateway sends, through a mobility management entity to which the mobile terminal belongs, the air interface transmission mode allowed to be used by the bearer to a base station to which the mobile terminal belongs for data transmission.

In a first possible implementation manner of the first aspect, before the receiving an enhanced policy and charging control rule sent by a policy and charging rule function entity, the method further includes:

sending a session establishment message to the policy and charging rule function entity, where the session establishment message comprises the indication information, so that the policy and charging rule function entity generates, according to the indication information and a policy and charging setting that corresponds to the mobile terminal, the enhanced policy and charging control rule for the service flow of the mobile terminal.

In combination with the first aspect or the first possible implementation manner of the first aspect, in a second possible implementation manner, if the service flow of the mobile terminal comprised in the enhanced policy and charging rule is a newly added service flow of the mobile terminal, the determining, according to the indication information and the enhanced policy and charging control rule, an air interface transmission mode allowed to be used by a bearer bound with a service flow of the mobile terminal includes:

judging whether the bearer bound with the newly added service flow is a newly established bearer or an existing bearer;

if the bearer bound with the newly added service flow is the newly established bearer, determining an air interface transmission mode, which is allowed to be used by the newly added service flow, as the air interface transmission mode allowed to be used by the bearer bound with the newly added service flow;

if the bearer bound with the newly added service flow is the existing bearer, determining an air interface transmission mode, which is allowed to be used by all service flows bound with the existing bearer, as the air interface transmission mode allowed to be used by the bearer bound with the newly added service flow.

In combination with the first aspect or any possible implementation manner of the first aspect, in a third possible implementation manner, if the service flow of the mobile terminal comprised in the enhanced policy and charging rule is a deleted service flow, the determining, according to the indication information and the enhanced policy and charging control rule, an air interface transmission mode allowed to be used by a bearer bound with a service flow of the mobile terminal includes:

judging whether the bearer bound with the deleted service flow is further bound with another service flow besides the deleted service flow; and if the bearer bound with the deleted service flow is further bound with the another service flow, determining an air interface transmission mode, which is allowed to be used by the another service flow, as the air interface transmission mode allowed to be used by the bearer bound with the deleted service flow.

In combination with the third possible implementation manner of the first aspect, in a fourth possible implementation manner, the determining an air interface transmission mode allowed to be used by a bearer bound with a service flow of the mobile terminal further includes:

if the bearer bound with the deleted service flow is not bound with the another service flow, deleting the bearer bound with the deleted service flow.

In combination with the first aspect or any possible implementation manner of the first aspect, in a fifth possible implementation manner, the air interface transmission mode allowed to be used by the bearer is sent from the mobility management entity to the base station by using a bearer establishment message or a bearer modification message.

In combination with the first aspect or any possible implementation manner of the first aspect, in a sixth possible implementation manner, after the sending a session establishment reply message to a serving gateway to which the mobile terminal belongs, the method further includes:

receiving a session establishment response message, where the session establishment response message comprises the air interface transmission mode determined for the bearer;

sending the determined air interface transmission mode to the policy and charging rule function entity;

receiving a charging rule sent by the policy and charging rule function entity, where the charging rule is a charging rule for the determined air interface transmission mode; and charging the bearer according to the charging rule.

In combination with the first aspect or any possible implementation manner of the first aspect, in a seventh possible implementation manner, the determined air interface transmission mode comprised in the session establishment response message is received by a packet gateway from the serving gateway by using the session establishment response message, and the determined air interface transmission mode is sent by the base station to the packet gateway via the mobility management entity and the serving gateway.

In a second aspect, a method for selecting a bearer mode is provided, and the method includes:

receiving a session establishment message sent by a packet gateway, where the session establishment message comprises indication information of an air interface transmission mode that is supported by a mobile terminal establishing a session;

generating an enhanced policy and charging control rule for a service flow of the mobile terminal according to the indication information and a policy and charging setting that corresponds to the mobile terminal, where the enhanced policy and charging control rule comprises the service flow of the mobile terminal, and an air interface transmission mode allowed to be used by the service flow of the mobile terminal; and sending the enhanced policy and charging control rule to the packet gateway, so that the packet gateway determines, according to the indication information and the enhanced policy and charging control rule, an air interface transmission mode allowed to be used by a bearer bound with the service flow of the mobile terminal; and sending the air interface transmission mode allowed to be used by the bearer to a base station to which the mobile terminal belongs through a serving gateway to which the mobile terminal belongs and a mobility management entity to which the mobile terminal belongs for data transmission.

In a first possible implementation manner of the second aspect, after the sending the enhanced policy and charging control rule to the packet gateway, the method further includes:

receiving the air interface transmission mode that is determined for the bearer and is sent by the packet gateway; and sending a charging rule of the determined air interface transmission mode to the packet gateway, so that the packet gateway charges the bearer according to the charging rule.

In a third aspect, a packet gateway is provided, and the packet gateway includes:

a first receiving unit, configured to receive indication information of an air interface transmission mode supported by a mobile terminal;

a second receiving unit, configured to receive an enhanced policy and charging control rule sent by a policy and charging rule function entity;

a determining unit, configured to determine, according to the indication information that is received by the first receiving unit and the enhanced policy and charging control rule that is received by the second receiving unit, an air interface transmission mode allowed to be used by a bearer, where the bearer is bound with a service flow of the mobile terminal, and the enhanced policy and charging control rule comprises the service flow of the mobile terminal, and an air interface transmission mode allowed to be used by the service flow of the mobile terminal; and a first sending unit, configured to send a session establishment reply message to a serving gateway to which the mobile terminal belongs, where the session establishment reply message comprises the air interface transmission mode allowed to be used by the bearer and the air interface transmission mode allowed to be used by the bearer is determined by the determining unit, so that the serving gateway sends, through a mobility management entity to which the mobile terminal belongs, the air interface transmission mode allowed to be used by the bearer to a base station to which the mobile terminal belongs for data transmission.

In a first possible implementation manner of the third aspect, the packet gateway further includes:

a second sending unit, configured to send a session establishment message to the policy and charging rule function entity, where the session establishment message comprises the indication information received by the first receiving unit, so that the policy and charging rule function entity generates the enhanced policy and charging control rule for the service flow of the mobile terminal according to the indication information and a policy and charging setting that corresponds to the mobile terminal.

In combination with the third aspect or the first possible implementation manner of the third aspect, in a second possible implementation manner, if the service flow of the mobile terminal comprised in the enhanced policy and charging rule is a newly added service flow of the mobile terminal, the determining unit includes:

a first judging module, configured to judge whether a bearer bound with the newly added service flow is a newly established bearer or an existing bearer;

a first determining module, configured to, if the first judging module determines that the bearer bound with the newly added service flow is the newly established bearer, determine an air interface transmission mode, which is allowed to be used by the newly added service flow, as the air interface transmission mode allowed to be used by the bearer bound with the newly added service flow; and a second determining module, configured to, if the first judging module determines that the bearer bound with the existing service flow is the existing bearer, determine an air interface transmission mode, which is allowed to be used by all service flows bound with the existing bearer, as the air interface transmission mode allowed to be used by the bearer bound with the newly added service flow.

In combination with the third aspect or any possible implementation manner of the third aspect, in a third possible implementation manner, if the service flow of the mobile terminal comprised in the enhanced policy and charging rule is a deleted service flow, the determining unit includes:

a second judging module, configured to judge whether the bearer bound with the deleted service flow is further bound with another service flow besides the deleted service flow;

a third determining module, configured to, if the second judging module that the bearer bound with the deleted service flow is further bound with the another service flow, determine an air interface transmission mode, which is allowed to be used by the another service flow, as the air interface transmission mode allowed to be used by the bearer bound with the deleted service flow; and a deleting module, configured to, if the second judging module that the bearer bound with the deleted service flow is not bound with the another service flow, delete the bearer bound with the deleted service flow.

In combination with the third aspect or any possible implementation manner of the third aspect, in a fourth possible implementation manner, the air interface transmission mode allowed to be used by the bearer is sent to the base station by using a bearer establishment message or a bearer modification message, where the air interface transmission mode allowed to be used by the bearer is determined by the determining unit.

In combination with the third aspect or any possible implementation manner of the third aspect, in a fifth possible implementation manner, the packet gateway further includes:

a third receiving unit, configured to receive a session establishment response message, where the session establishment response message comprises the air interface transmission mode determined for the bearer;

a third sending unit, configured to send the determined air interface transmission mode received by the third receiving unit to the policy and charging rule function entity;

a fourth receiving unit, configured to receive a charging rule sent by the policy and charging rule function entity, where the charging rule is a charging rule for the determined air interface transmission mode; and a charging unit, configured to charge the bearer according to the charging rule received by the fourth receiving unit.

In combination with the fifth possible implementation manner of the third aspect, in a sixth possible implementation manner, the determined air interface transmission mode that is comprised in the session establishment response message received by the third receiving unit is received by the packet gateway from the serving gateway by using the session establishment response message, and the determined air interface transmission mode is sent by the base station to the packet gateway via the mobility management entity and the serving gateway.

In a fourth aspect, a policy and charging rule function entity is provided, and the policy and charging rule function entity includes:

a fifth receiving unit, configured to receive a session establishment message sent by a packet gateway, where the session establishment message comprises indication information of an air interface transmission mode that is supported by a mobile terminal establishing a session;

a generating unit, configured to generate an enhanced policy and charging control rule for a service flow of the mobile terminal according to the indication information that is received by the fifth receiving unit and a policy and charging setting that corresponds to the mobile terminal, where the enhanced policy and charging control rule comprises the service flow of the mobile terminal, and an air interface transmission mode allowed to be used by the service flow of the mobile terminal; and a fourth sending unit, configured to send the enhanced policy and charging control rule generated by the generating unit to the packet gateway, so that the packet gateway determines, according to the indication information and the enhanced policy and charging control rule, an air interface transmission mode allowed to be used by a bearer bound with the service flow of the mobile terminal; and sends the air interface transmission mode allowed to be used by the bearer to a base station to which the mobile terminal belongs through a serving gateway to which the mobile terminal belongs and a mobility management entity to which the mobile terminal belongs for data transmission.

In a fifth possible implementation manner of the fifth aspect, the policy and charging rule function entity further includes:

a sixth receiving unit, configured to receive the air interface transmission mode that is determined for the bearer and is sent by the packet gateway; and a fifth sending unit, configured to send a charging rule of the determined air interface transmission mode received by the sixth receiving unit to the packet gateway, so that the packet gateway charges the bearer according to the charging rule.

In a sixth aspect, a system for selecting a bearer mode is provided, and the system includes:

a packet gateway, configured to receive indication information of an air interface transmission mode supported by a mobile terminal; receive an enhanced policy and charging control rule sent by a policy and charging rule function entity; determine, according to the indication information and the enhanced policy and charging control rule, an air interface transmission mode allowed to be used by a bearer bound with a service flow of the mobile terminal; and send a session establishment reply message to a serving gateway to which the mobile terminal belongs, where the enhanced policy and charging control rule comprises the service flow of the mobile terminal, and an air interface transmission mode allowed to be used by the service flow of the mobile terminal; and the session establishment reply message comprises the air interface transmission mode allowed to be used by the bearer; and the policy and charging rule function entity, configured to receive the session establishment message; generate the enhanced policy and charging control rule for the service flow of the mobile terminal according to the indication information and a policy and charging setting that corresponds to the mobile terminal; and send the enhanced policy and charging control rule to the packet gateway, where the session establishment message comprises the indication information.

In a first possible implementation manner of the sixth aspect, the system further includes:

a base station, configured to receive a bearer establishment message or a bearer modification message sent by the packet gateway through the serving gateway and a mobility management entity to which the mobile terminal belongs, where the bearer establishment message or the bearer modification message comprises air interface transmission modes allowed to be used by a bearer; and determine an air interface transmission mode, in the air interface transmission mode allowed to be used by the bearer, which satisfies a quality of service requirement of the bearer and has the best air interface link quality of each air interface transmission mode of the mobile terminal, as the air interface transmission mode of the bearer, and configure the bearer to transmit data in the determined air interface transmission mode. After the solution is adopted, the base station selects an appropriate air interface transmission mode for the bearer according to an air interface transmission mode allowed to be used by each bearer on an air interface and then according to air interface link quality information of each air interface transmission mode of the mobile terminal, a network load of each air interface transmission mode, and quality of service information of a relevant bearer of the mobile terminal, and sends information about the last air interface transmission mode selected for the bearer to a core network, and the core network charges the bearer according to different air interface transmission modes, where the core network may include: a packet gateway, a policy and charging rule function entity, a serving gateway, and a mobility management entity.

BRIEF DESCRIPTION OF DRAWINGS

To illustrate the technical solutions according to the embodiments of the present invention more clearly, the following briefly introduces accompanying drawings required for describing the embodiments. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
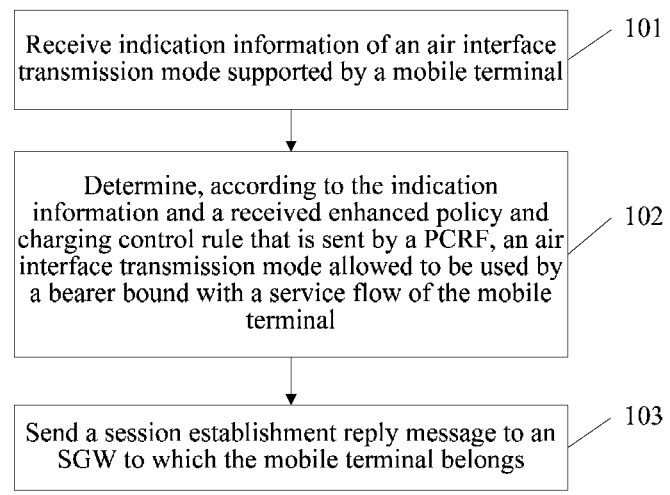
FIG. 1 is a flow chart of a method for selecting a bearer mode according to an embodiment of the present invention.

An embodiment of the present invention provides a method for selecting a bearer mode, as shown in FIG. 1, including the following steps:

101: Receive indication information of an air interface transmission mode supported by a mobile terminal.

The indication information is used to describe the air interface transmission mode supported by the mobile terminal on an air interface.

Specifically, to foreshadow subsequent steps, before determining an allowed air interface transmission mode for a bearer, a core network at first obtains the indication information sent by the mobile terminal.

102: Determine, according to the indication information and a received enhanced policy and charging control rule that is sent by a PCRF, an air interface transmission mode allowed to be used by a bearer bound with a service flow of the mobile terminal.

The enhanced policy and charging control rule comprises the service flow of the mobile terminal, and an air interface transmission mode allowed to be used by the service flow of the mobile terminal.

Each bearer of the mobile terminal is bound with at least one service flow, and because types of service flows or subscriber categories in a policy and charging setting of the mobile terminal may be different, air interface transmission modes allowed to be used by different service flows on the air interface are different.

The core network determines, according to the indication information and a received enhanced policy and charging control rule that is sent by a PCRF, an air interface transmission mode allowed to be used by each service flow on the air interface.

The core network determines, according to the air interface transmission mode allowed to be used by each service flow bound with a bearer, an air interface transmission mode allowed to be used by the bearer on the air interface.

103: Send a session establishment reply message to an SGW to which the mobile terminal belongs.

The session establishment reply message comprises the air interface transmission mode allowed to be used by the bearer, so that the SGW sends, through an MME to which the mobile terminal belongs, the air interface transmission mode allowed to be used by the bearer to a base station to which the mobile terminal belongs for data transmission.

Specifically, the core network provides the base station with an air interface transmission mode allowed to be used by each bearer, and the base station then determines an air interface transmission mode for the bearer according to information such as network load information of each air interface transmission mode, air interface link quality of each air interface transmission mode of the mobile terminal on the air interface, and QoS of the bearer.

In the method for selecting a bearer mode provided by this embodiment, after the solution is adopted, the core network sends the session establishment reply message to the base station, so that the base station selects an air interface transmission mode for the bearer according to information such as an air interface transmission mode that is allowed to be used by each bearer on an air interface and is indicated by the core network, network load information of each air interface transmission mode available to the mobile terminal, air interface link quality of each air interface transmission mode of the mobile terminal on the air interface, and QoS of the bearer.

Figure 2:
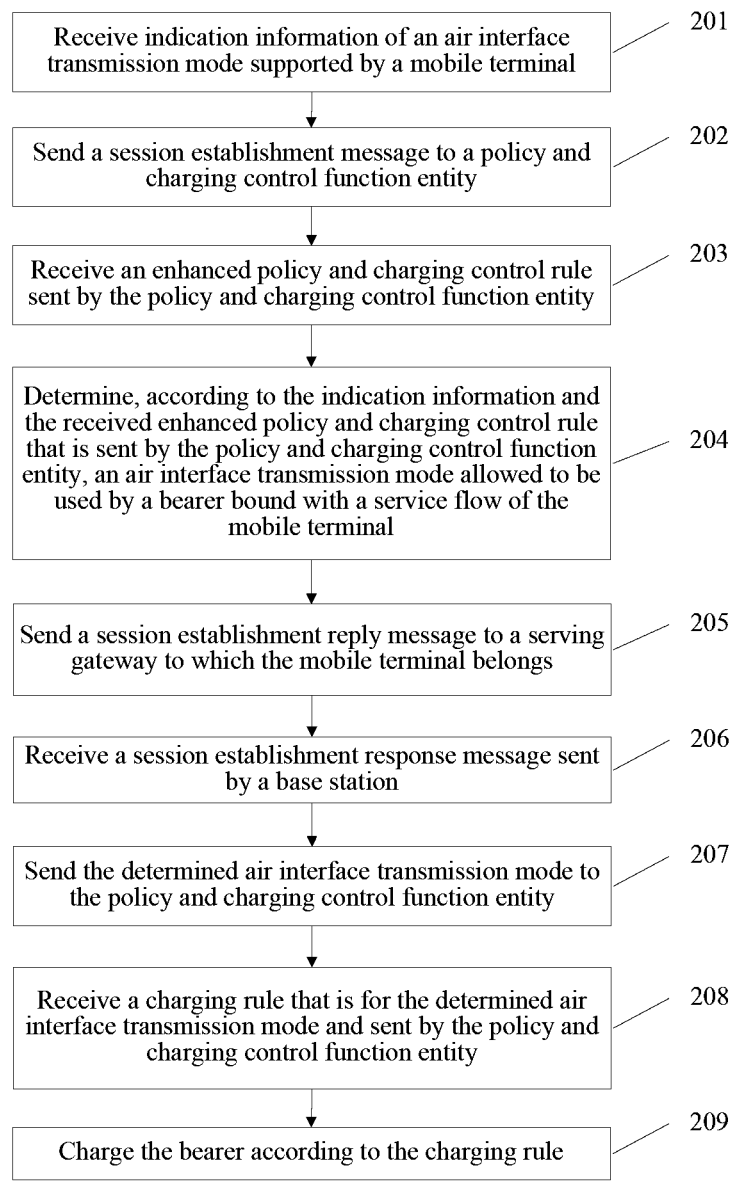
FIG. 2 is a flow chart of another method for selecting a bearer mode according to an embodiment of the present invention.

This embodiment provides another method for selecting a bearer mode. The method describes that a service flow is added or deleted, and therefore an air interface transmission mode currently used by a corresponding bearer is not the most appropriate air interface transmission mode anymore, and an air interface transmission mode allowed by the bearer needs to be updated. As shown in FIG. 2, the method includes the following steps:

201: Receive indication information of an air interface transmission mode supported by a mobile terminal.

The indication information is used to describe the air interface transmission mode supported by the mobile terminal on an air interface.

To reduce the load amount of a single air interface transmission mode, a network provides at least two air interface transmission modes, a base station selects an appropriate air interface transmission mode for a relevant bearer of the mobile terminal according to a practical situation, and the relevant bearer of the mobile terminal may transmit data in different air interface transmission modes, thereby not only solving the problem of a large load amount of the single air interface transmission mode, but also improving data transmission efficiency and quality of the relevant bearer of the mobile terminal.

Specifically, to foreshadow subsequent steps, before determining an allowed air interface transmission mode for a bearer, a core network at first receives the indication information of the air interface transmission mode supported by the mobile terminal.

The core network includes an MME (mobility management entity), an SGW (serving gateway), a PGW (Packet Gateway), a PCRF (policy and charging rule function), where the MME receives the indication information and sends the indication information to the PCRF through the SGW and the PGW.

As an implementation manner of this embodiment, the air interface transmission mode may be a 3GPP mode, a Wi-Fi mode, or an LTE/Wi-Fi hybrid mode.

This embodiment imposes no limitation on the air interface transmission mode, which may be any air interface transmission mode well known by persons skilled in the art, and no more details are given here.

202: Send a session establishment message to the PCRF.

Specifically, the session establishment message is sent to the PCRF, and the session establishment message comprises the indication information, so that the PCRF generates an enhanced policy and charging control rule for a service flow of the mobile terminal according to the indication information and a policy and charging setting that corresponds to the mobile terminal.

203: Receive the enhanced policy and charging control rule sent by the PCRF.

After generating the enhanced policy and charging control rule for the service flow of the mobile terminal according to the indication information and the policy and charging setting that corresponds to the mobile terminal, the PCRF sends the generated enhanced policy and charging control rule to the PGW, and the PGW receives the enhanced policy and charging control rule sent by the PCRF.

The enhanced policy and charging control rule comprises the service flow of the mobile terminal, and an air interface transmission mode allowed to be used by the service flow of the mobile terminal.

204: Determine, according to the indication information and the received enhanced policy and charging control rule that is sent by the PCRF, an air interface transmission mode allowed to be used by a bearer bound with a service flow of the mobile terminal.

Each bearer of the mobile terminal is bound with at least one service flow, and because types of service flows or subscriber categories in the policy and charging setting of the mobile terminal may be different, air interface transmission modes allowed to be used by different service flows on the air interface are different.

The core network determines, according to the indication information and the enhanced policy and charging control rule, an air interface transmission mode allowed to be used by each service flow on the air interface.

The core network determines, according to the air interface transmission mode allowed to be used by each service flow bound with a bearer, an air interface transmission mode allowed to be used by the bearer on the air interface.

Figure 3:
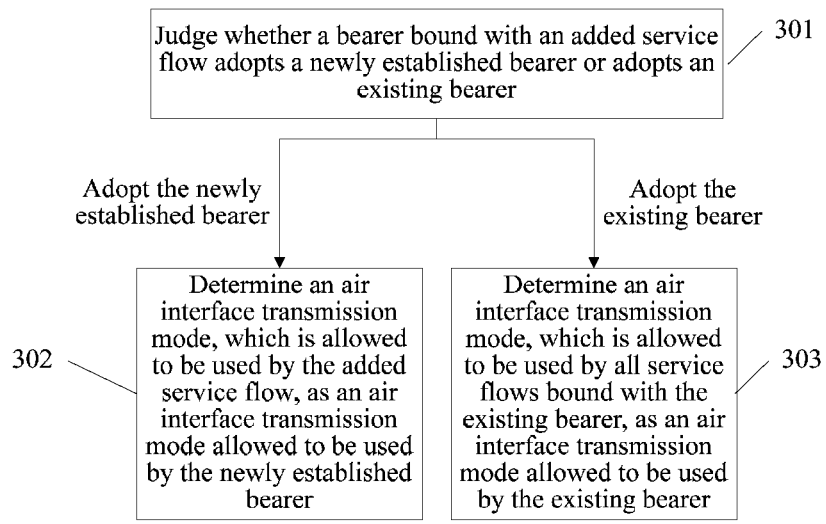
FIG. 3 is a flow chart of a method for selecting a bearer mode after a terminal service flow is added according to an embodiment of the present invention.

Further, as shown in FIG. 3, if the enhanced policy and charging rule comprises a newly added service flow of the mobile terminal, the step of determining, according to the indication information and the received enhanced policy and charging control rule that is sent by the PCRF, an air interface transmission mode allowed to be used by a bearer bound with a service flow of the mobile terminal may include the following steps:

301: Judge whether a bearer bound with the added service flow adopts a newly established bearer or adopts an existing bearer.

Specifically, if the newly established bearer is adopted, step 302 is executed; if the deleted enhanced policy and charging rule comprises a service flow of the mobile terminal, step 303 is executed.

302: Determine an air interface transmission mode, which is allowed to be used by the added service flow, as an air interface transmission mode allowed to be used by the newly established bearer.

If the newly established bearer is adopted, the newly established bearer comprises only the newly added service flow at this time. Therefore, the air interface transmission mode allowed by the newly added service flow is determined as the air interface transmission mode of the newly established bearer.

303: Determine an air interface transmission mode, which is allowed to be used by all service flows bound with the existing bearer, as an air interface transmission mode allowed to be used by the existing bearer.

All the service flows bound with the existing bearer comprise the newly added service flow.

Figure 4:
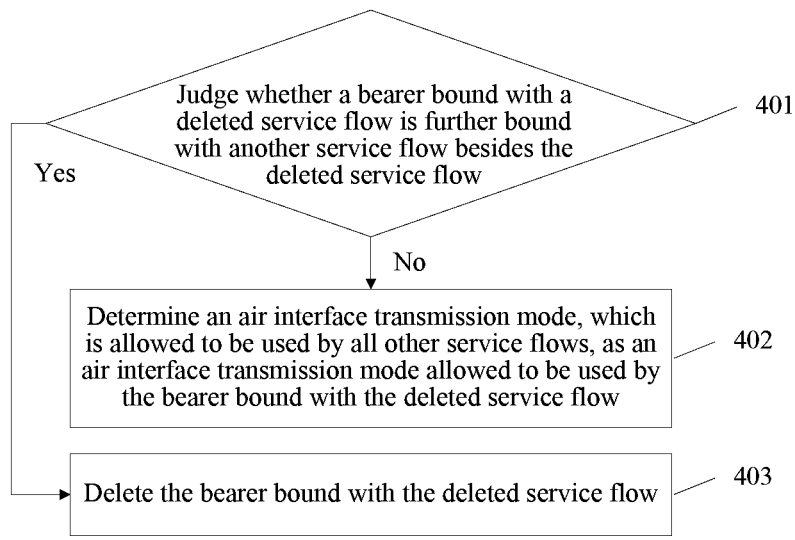
FIG. 4 is a flow chart of a method for selecting a bearer mode after a terminal service flow is deleted according to an embodiment of the present invention.

Further, as shown in FIG. 4, if the deleted enhanced policy and charging rule comprises a service flow of the mobile terminal, the step of determining, according to the indication information and the enhanced policy and charging control rule, an air interface transmission mode allowed to be used by a bearer bound with a service flow of the mobile terminal may include the following steps:

401: Judge whether a bearer bound with the deleted service flow is further bound with another service flow besides the deleted service flow.

Specifically, if the bearer bound with the deleted service flow is further bound with another service flow, step 402 is executed; if the bearer bound with the deleted service flow is not bound with the another service flow, step 403 is executed.

402: Determine an air interface transmission mode, which is allowed to be used by all other service flows, as an air interface transmission mode allowed to be used by the bearer bound with the deleted service flow.

403: Delete the bearer bound with the deleted service flow.

Figure 5:
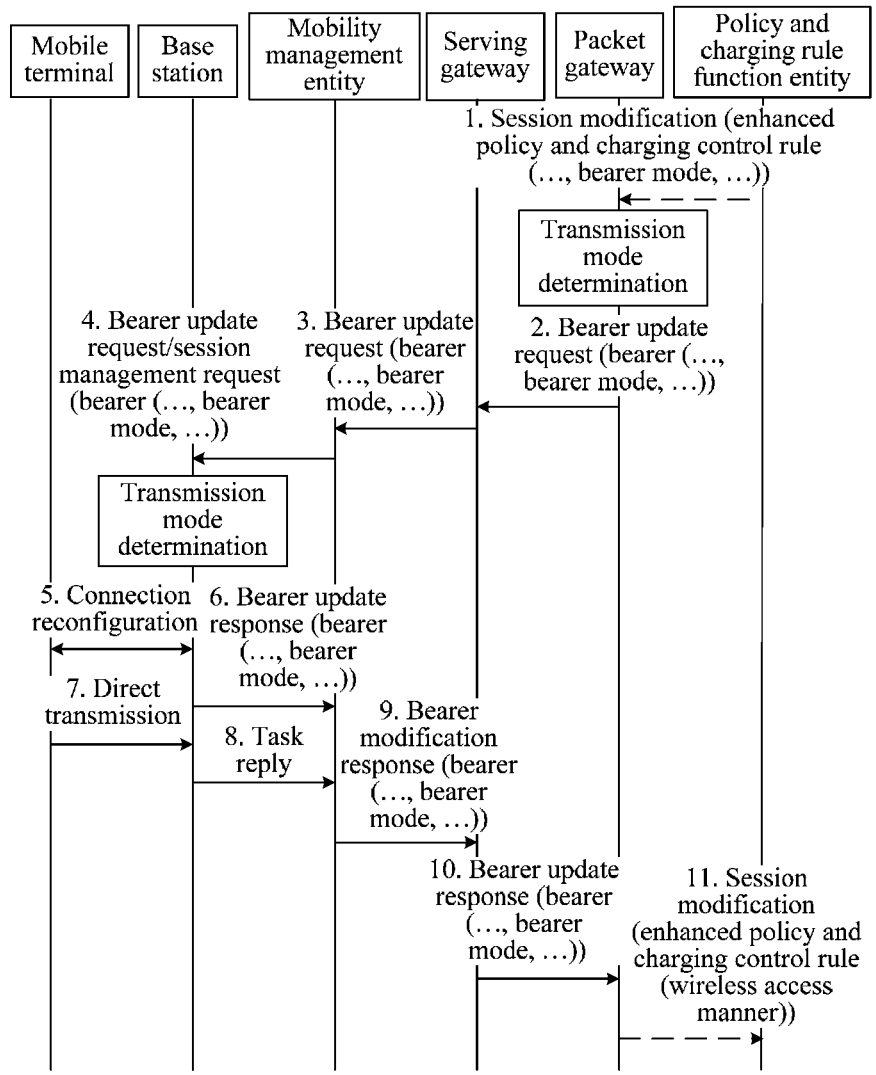
FIG. 5 is a schematic diagram of a specific procedure of the method for selecting a bearer mode provided in FIG. 3 or FIG. 4 according to an embodiment of the present invention.

Specifically, after a service flow is added or deleted, a specific procedure of the method for selecting a bearer mode is shown in FIG. 5.

205: Send a session establishment reply message to the SGW to which the mobile terminal belongs, where the session establishment reply message comprises the air interface transmission mode allowed to be used by the bearer, so that the SGW sends, through the MME to which the mobile terminal belongs, the air interface transmission mode allowed to be used by the bearer to a base station to which the mobile terminal belongs for data transmission.

Further, the PGW at first sends indication information of an air interface transmission mode allowed to be used by each bearer to the SGW by using the session establishment reply message; the SGW then continues to send the message to the MME; the MME finally sends the message to the base station to which the mobile terminal belongs.

Specifically, the air interface transmission mode that is allowed to be used by the bearer and is comprised in the session establishment reply message is at first sent to the MME to which the mobile terminal belongs through the SGW, and then sent to the base station by sending, by the MME, a bearer establishment message or a bearer modification message to the base station, where the bearer establishment message or the bearer modification message includes the air interface transmission mode allowed to be used by the bearer.

As an implementation manner of this embodiment, after the core network determines an air interface transmission mode allowed to be used on an air interface for a bearer, the base station selects an appropriate air interface transmission mode for the bearer according to information such as network load information corresponding to each air interface transmission mode available to the bearer on the air interface, air interface link quality of each air interface transmission mode of the mobile terminal on an air interface, and QoS of the bearer.

As an implementation manner of this embodiment, to enable a bearer to transmit data rapidly and accurately during communication in an air interface transmission mode, the base station selects, from the air interface transmission modes available to the bearer on the air interface, an air interface transmission mode where the quality of an air interface link between the mobile terminal and a network that corresponds to each air interface transmission mode available on the air interface is relatively good, the QoS of the bearer is satisfied, and the network load is relatively small, and determines the air interface transmission mode as an appropriate air interface bearer mode of the bearer.

The base station configures, according to the selected air interface bearer mode, the mobile terminal to transmit a service flow of the relevant bearer in the selected air interface bearer mode.

This embodiment imposes no limitation on a specific algorithm for selecting an air interface bearer mode, which may be any method well known by persons skilled in the art.

206: Receive a session establishment response message sent by the base station.

The session establishment response message comprises the air interface transmission mode determined for the bearer.

Charging rules corresponding to different air interface transmission modes may be different, and the air interface transmission mode in the session establishment response message is used to instruct the core network to charge the bearer.

Further, the MME receives the air interface transmission mode in the session establishment response message sent by the base station, and sends the air interface transmission mode in the session establishment response message to the PGW through the SGW, and the PGW sends the air interface transmission mode in the session establishment response message to the PCRF, so as to obtain a corresponding charging rule.

Specifically, the determined air interface transmission mode comprised in the session establishment response message is at first sent to the MME through the base station, then sent to the SGW through the MME, and finally sent to the PGW by sending, by the SGW, the session establishment response message to the PGW, where the session establishment response message comprises the determined air interface transmission mode.

207: Send the determined air interface transmission mode to the PCRF.

The determined air interface transmission mode is sent to the PCRF, so that the PCRF sends a charging rule of the determined air interface transmission mode to the PGW according to the determined air interface transmission mode.

208: Receive the charging rule for the determined air interface transmission mode and sent by the PCRF.

The PCRF generates a different charging rule for a corresponding mobile terminal according to the air interface transmission mode in the session establishment response message and in combination with a local charging policy setting, and sends the charging rule to the PGW to which the mobile terminal belongs, so that the PGW charges a corresponding bearer according to the charging rule.

209: Charge the bearer according to the charging rule.

Figure 6:
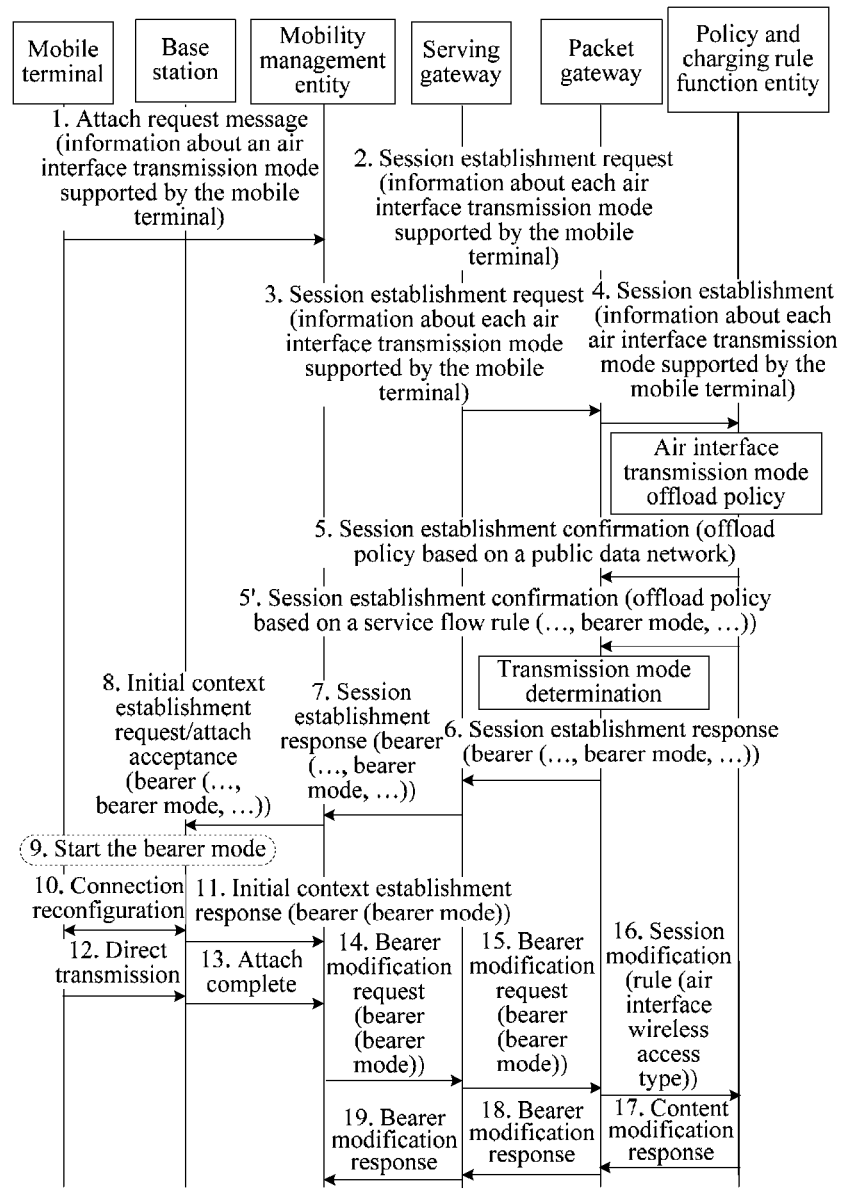
FIG. 6 is a schematic diagram of a specific procedure of the method for selecting a bearer mode provided in FIG. 2 according to an embodiment of the present invention.

The specific process is shown in FIG. 6.

After the solution is adopted, the most appropriate air interface transmission mode may be promptly updated for each bearer according to the change of the service flow on the bearer, thereby improving data transmission efficiency, and guaranteeing quality of service requirements of different service flows.

Figure 7:
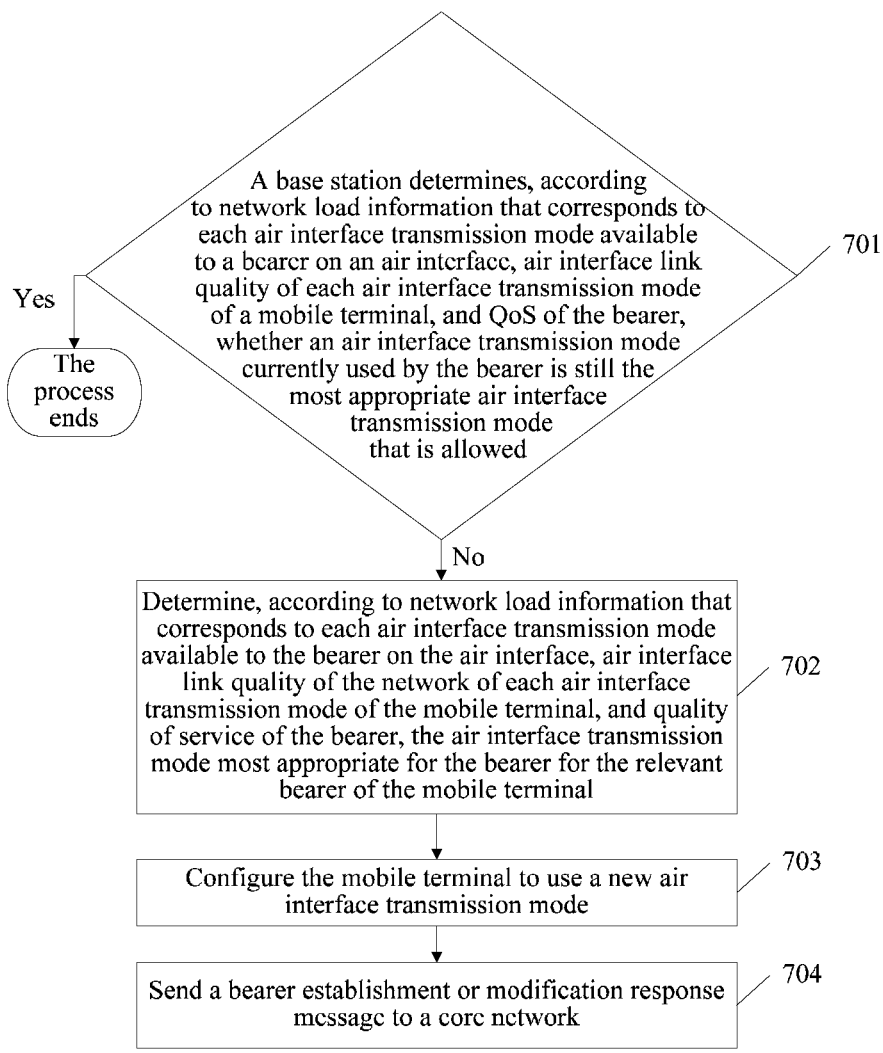
FIG. 7 is a flow chart of a method for selecting a bearer mode when a base station needs to actively modify a bearer mode according to an embodiment of the present invention.

To understand the present invention more comprehensively, this embodiment provides another method for selecting a bearer mode. The method describes that because of a reason such as the change of the air interface link quality of the mobile terminal or a load change of a network of each air interface transmission mode, a current air interface transmission mode of a certain bearer is not an appropriate transmission mode anymore, and the base station actively initiates a process of modifying the air interface transmission mode for the bearer at this time. As shown in FIG. 7, the method includes the following steps:

701: A base station determines, according to network load information corresponding to each air interface transmission mode available to a bearer on an air interface, air interface link quality of each air interface transmission mode of a mobile terminal, and QoS of the bearer, whether an air interface transmission mode currently used by the bearer is still the most appropriate air interface transmission mode that is allowed.

As an implementation manner of this embodiment, an air interface transmission mode currently used by a relevant bearer of the mobile terminal may be not the most appropriate air interface transmission mode of the bearer anymore because of network load information that corresponds to each air interface transmission mode available to the bearer on an air interface, air interface link quality of each air interface transmission mode of the mobile terminal, and QoS of the bearer. Therefore, the relevant bearer of the mobile terminal needs to modify the air interface transmission mode.

The base station periodically determines, according to the network load information that corresponds to each air interface transmission mode available to the bearer on the air interface, the air interface link quality of the network of each air interface transmission mode of the mobile terminal, and the QoS of the bearer, whether the air interface transmission mode used by the relevant bearer of the mobile terminal is still the most appropriate air interface transmission mode, and further determines whether it is required to modify the air interface transmission mode of the bearer.

If the air interface transmission mode used by the relevant bearer of the mobile terminal is not the most appropriate air interface transmission mode anymore, step 702 is executed; otherwise, the process ends.

702: Determine, according to network load information corresponding to each air interface transmission mode available to a bearer on an air interface, air interface link quality of the network of each air interface transmission mode of a mobile terminal, and QoS of the bearer, the air interface transmission mode most appropriate for the bearer for the relevant bearer of the mobile terminal.

For example, QoS that can be provided by different air interface transmission modes may be different, and if QoS of an air interface transmission mode cannot satisfy QoS required for a bearer, the bearer may be unsuitable to perform communication in the air interface transmission mode.

Therefore, the base station determines, according to network load information that corresponds to each air interface transmission mode available to a bearer on an air interface, quality of an air interface link between the mobile terminal and a network that corresponds to each air interface transmission mode available to the bearer on the air interface, and QoS of the bearer, the air interface transmission mode most matched with the bearer for the relevant bearer of the mobile terminal.

This embodiment imposes no limitation on a specific method for selecting an air interface mode, which may be any method well known by persons skilled in the art, and no more details are given here.

703: Configure the mobile terminal to use a new air interface transmission mode.

Based on the latest selected air interface transmission mode, the base station configures the mobile terminal to transmit data in the newly selected air interface transmission mode instead of the original air interface transmission mode.

704: Send a session establishment response message to a core network.

The session establishment response message comprises the air interface transmission mode latest selected by the bearer, so that the core network charges a corresponding bearer of the mobile terminal according to the determined air interface transmission mode.

Charging rules of different air interface transmission modes are different, and the core network separately charges relevant bearers according to a charging rule corresponding to the latest air interface transmission mode.

A specific charging procedure is the same as that of step 206 to step 209.

Figure 8:
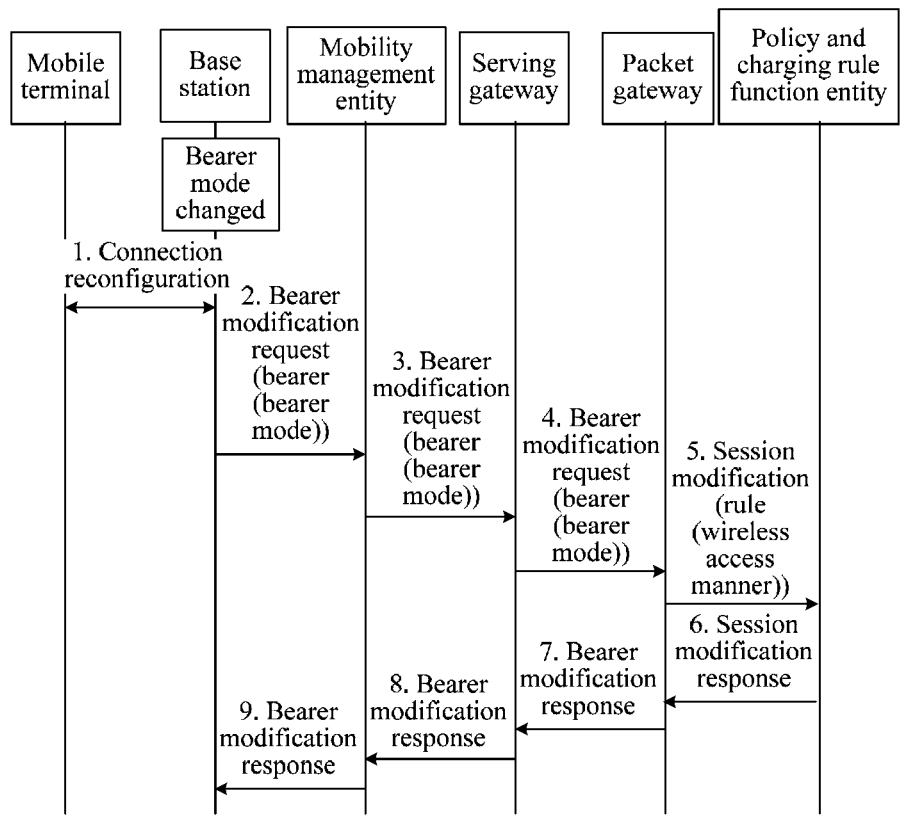
FIG. 8 is a schematic diagram of a specific procedure of the method for selecting a bearer mode provided in FIG. 7 according to an embodiment of the present invention.

The specific procedure is shown in FIG. 8.

In the method for selecting a bearer mode provided by this embodiment, after the solution is adopted, the base station periodically selects the most appropriate air interface transmission mode for the bearer according to the network load of each air interface transmission mode of the mobile terminal, the air interface link quality of each air interface transmission mode of the mobile terminal, and the QoS of the bearer, configures the mobile terminal to transmit data in the latest selected air interface transmission mode, and sends information about the air interface transmission mode selected for the bearer to the core network to perform charging, thereby improving transmission efficiency of the base station, and guaranteeing quality of service requirements of different bearers.

Figure 9:
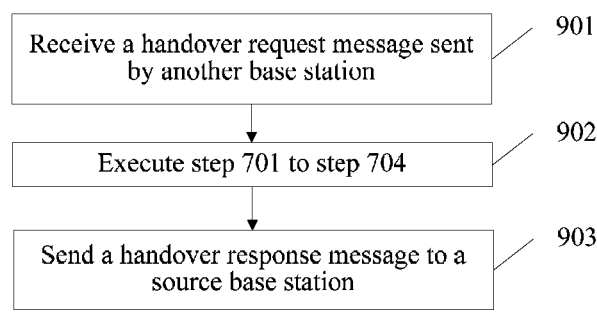
FIG. 9 is a flow chart of a method for selecting a bearer mode when a mobile terminal hands over between base stations and as a result a relevant bearer of the mobile terminal modifies an air interface transmission mode according to an embodiment of the present invention.

This embodiment provides another method for selecting a bearer mode. The method describes that a destination base station initiates an air interface mode modification or confirmation process because of handover of a mobile terminal. As shown in FIG. 9, the method includes the following steps:

901: Receive a handover request message sent by another base station.

The handover request message carries a relevant bearer of the mobile terminal required to be handed over to the destination base station, and an air interface transmission mode currently used by the relevant bearer.

Before the mobile terminal is handed over from a source base station to the destination base station, the handover request message is sent to the destination base station, so that the destination base station determines, according to the handover request message, an appropriate air interface transmission mode for the relevant bearer of the mobile terminal required to be handed over to the destination base station.

902: Execute step 701 to step 704.

903: Send a handover response message to the source base station, where the handover response message comprises an air interface communication mode selected by the destination base station for the relevant bearer of the mobile terminal required to be handed over to the destination base station.

Figure 10:
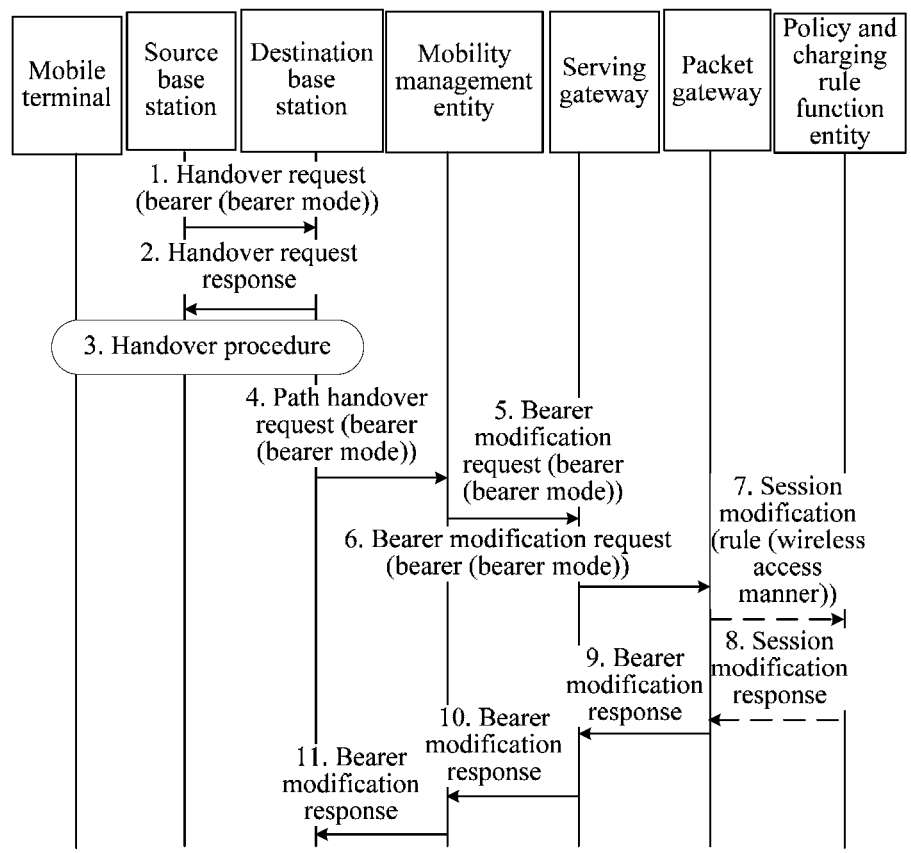
FIG. 10 is a schematic diagram of a specific procedure of the method for selecting a bearer mode provided in FIG. 9 according to an embodiment of the present invention.

A specific procedure is shown in FIG. 10.

In the method for selecting a bearer mode provided by this embodiment, when a mobile terminal is handed over to a destination base station, the destination base station determines, according to quality of service information of a current bearer of the mobile terminal and a communication mode, a new air interface transmission mode for each bearer of the mobile terminal, and sends the selected air interface transmission mode to a PCRF, so that the PCRF generates a policy and charging rule according to different air interface transmission modes, and sends the rule to the PGW to perform charging.

Figure 11:
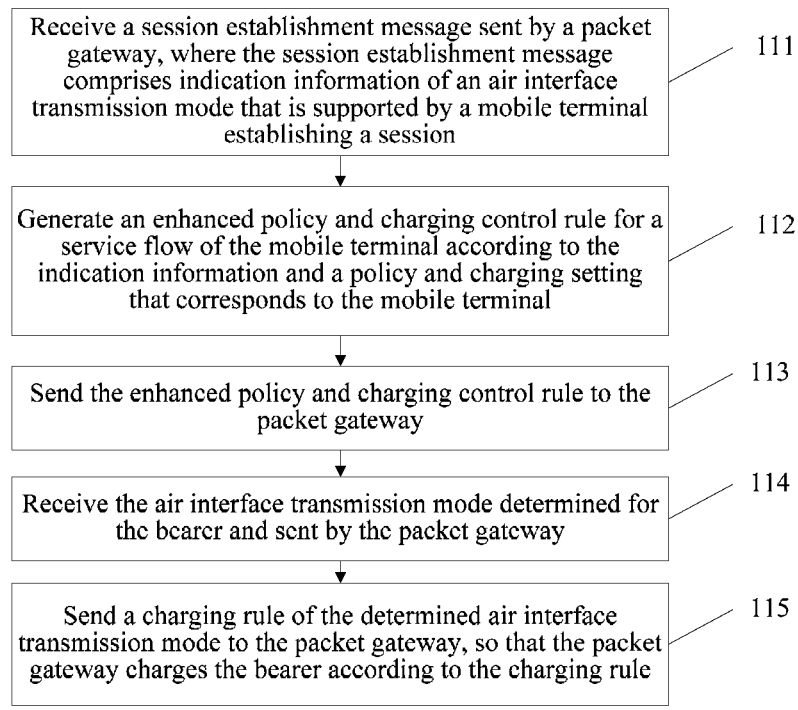
FIG. 11 is a flow chart of a method for selecting a bearer mode, taking a PCRF as an execution subject, according to an embodiment of the present invention.

This embodiment provides another method for selecting a bearer mode, the execution subject of the method is a PCRF, and as shown in FIG. 11, the method includes the following steps:

111: Receive a session establishment message sent by a PGW, where the session establishment message comprises indication information of an air interface transmission mode that is supported by a mobile terminal establishing a session.

112: Generate an enhanced policy and charging control rule for a service flow of the mobile terminal according to the indication information and a policy and charging setting that corresponds to the mobile terminal, where the enhanced policy and charging control rule comprises the service flow of the mobile terminal, and an air interface transmission mode allowed to be used by the service flow of the mobile terminal.

Each relevant bearer of the mobile terminal is bound with at least one service flow, and because types of service flows or subscriber categories in the policy and charging setting of the mobile terminal are different, air interface transmission modes allowed to be used by different service flows are different.

As an implementation manner of this embodiment, two offload policies are included: an offload policy based on a PDN (public data network), and an offload policy based on a PCC (service flow) rule.

The offload policy based on the PDN indicates an air interface transmission mode allowed to be used on the PDN granularity for the mobile terminal; the offload policy based on the PCC rule indicates an air interface transmission mode allowed to be used on the service flow granularity for the mobile terminal. The above offload policies are comprised in the enhanced policy and charging control rule. The following content is illustrated by using the offload policy based on the PCC rule as an example.

The PCRF sends the generated enhanced policy and charging control rule comprising the offload policy to the PGW, and the PGW obtains, according to the offload policy, a bearer bound with a service flow, and further obtains air interface transmission modes supported other service flows.

The offload policy based on the PDN and the offload policy based on the PCC rule provided by this embodiment are technologies well known by persons skilled in the art, and no more details are given here.

As an implementation manner of this embodiment, an air interface transmission mode allowed to be used by all service flows bound with the bearer is determined as an air interface transmission mode allowed to be used by the bearer on an air interface.

The PGW determines, according to an air interface transmission mode allowed to be used by each service flow in a bearer, an air interface transmission mode allowed to be used by the bearer on the air interface.

As an implementation manner of this embodiment, if a bearer is allowed to use a certain air interface transmission mode such as a Wi-Fi mode on an air interface, identity information of the Wi-Fi mode such as "1" may be carried in a bearer establishment message or a bearer modification message transmitted to a base station to which the mobile terminal belongs, indicating that the corresponding bearer is allowed to use the Wi-Fi mode on the air interface; if the bearer establishment message or the bearer modification message does not carry the identity information "1" of the Wi-Fi mode, it indicates that the corresponding bearer is not allowed to use the Wi-Fi mode on the air interface. If available air interface transmission modes for the bearer on the air interface include multiple air interface transmission modes, a unique identity may be set for each air interface transmission mode, and the identity of the air interface transmission mode available to the corresponding bearer on the air interface is carried in the bearer establishment message or the bearer modification message.

This implementation imposes no limitation on a method for indicating an air interface transmission mode allowed to be used by a bearer, which may be any indication method well known by persons skilled in the art.

113: Send the enhanced policy and charging control rule to the PGW, so that the PGW determines, according to the indication information and the enhanced policy and charging control rule, an air interface transmission mode allowed to be used by a bearer bound with the service flow of the mobile terminal; and sends the air interface transmission mode allowed to be used by the bearer to a base station to which the mobile terminal belongs through an SGW to which the mobile terminal belongs and an MME to which the mobile terminal belongs for data transmission.

114: Receive the air interface transmission mode that is determined for the bearer and is sent by the PGW.

115: Send a charging rule of the determined air interface transmission mode to the PGW, so that the PGW charges the bearer according to the charging rule.

After the solution is adopted, the PCRF generates the enhanced policy and charging control rule according to the indication information and a policy and charging setting that corresponds to the mobile terminal, and sends the enhanced policy and charging control rule to the PGW, so that the PGW determines, according to the indication information and the enhanced policy and charging control rule, air interface transmission modes allowed to be used by the bearer bound with the service flow of the mobile terminal, and sends the air interface transmission modes allowed to be used by the bearer to the base station to which the mobile terminal belongs; the base station selects an air interface transmission mode from the air interface transmission modes, which are allowed to be used, as a bearer mode of the bearer; the bearer performs more efficient communication in the bearer mode.

Figure 12:
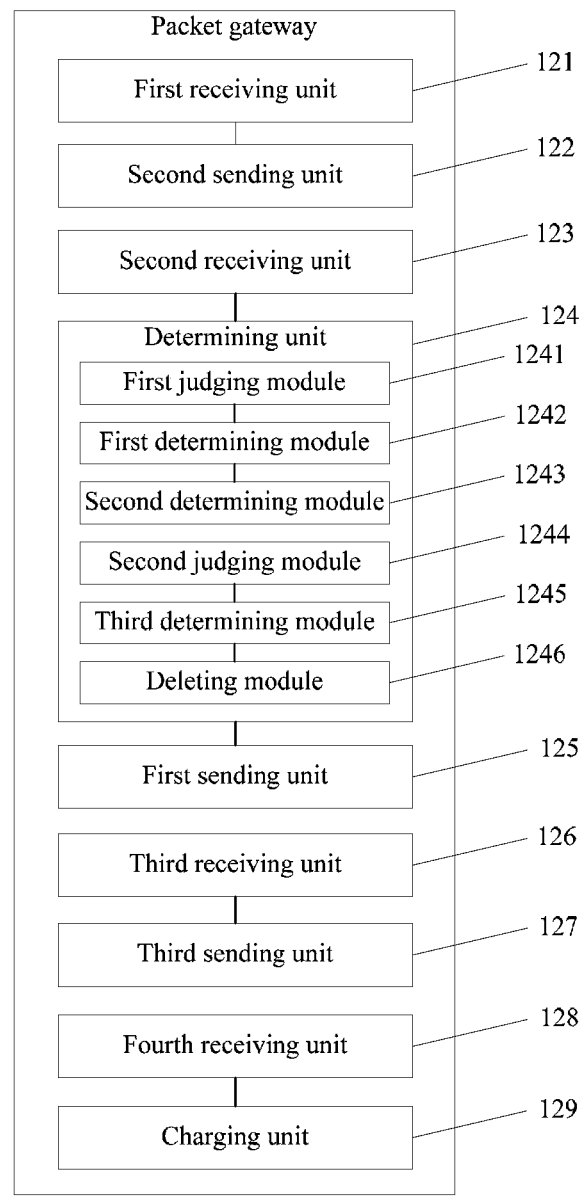
FIG. 12 is a schematic structural diagram of a packet gateway according to an embodiment of the present invention.

This embodiment provides a PGW, as shown in FIG. 12, including: a first receiving unit 121, a second sending unit 122, a second receiving unit 123, a determining unit 124, a first sending unit 125, a third receiving unit 126, a third sending unit 127, a fourth receiving unit 128, and a charging unit 129.

Specifically, the determining unit 124 includes: a first judging module 1241, a first determining module 1242, a second determining module 1243, a second judging module 1244, a third determining module 1245, and a deleting module 1246.

In this embodiment, the first receiving unit 121, the first sending unit 125, and the third receiving unit 126 include an MME, an SGW, and a PGW in a core network; the second sending unit 122, the second receiving unit 123, the determining unit 124, the third sending unit 127, the fourth receiving unit 128, and the charging unit 129 include a PGW in the core network.

The first receiving unit 121 is configured to receive indication information of an air interface transmission mode supported by a mobile terminal.

To reduce the load amount of a single air interface transmission mode, a network provides at least two air interface transmission modes, a base station selects an appropriate air interface transmission mode for a relevant bearer of the mobile terminal according to a practical situation, and the relevant bearer of the mobile terminal may transmit data in different air interface transmission modes, thereby not only solving the problem of a large load amount of the single air interface transmission mode, but also improving data transmission efficiency and quality of the relevant bearer of the mobile terminal.

Specifically, before the core network determines an allowed air interface transmission mode for a bearer, the first receiving unit at first receives the indication information of the air interface transmission mode supported by the mobile terminal.

The second sending unit 122 is configured to send a session establishment message to a PCRF.

The session establishment message comprises the indication information received by the first receiving unit.

Specifically, the second sending unit sends the session establishment message to the PCRF, so that the PCRF generates an enhanced policy and charging control rule for a service flow of the mobile terminal according to the indication information and a policy and charging setting that corresponds to the mobile terminal.

The second receiving unit 123 is configured to receive the enhanced policy and charging control rule sent by the PCRF.

The determining unit 124 is configured to determine, according to the indication information and the enhanced policy and charging control rule, an air interface transmission mode allowed to be used by a bearer, where the bearer is bound with the service flow of the mobile terminal, and the enhanced policy and charging control rule comprises the service flow of the mobile terminal, and an air interface transmission mode allowed to be used by the service flow of the mobile terminal.

Specifically, the first judging module 1241 is configured to judge whether a bearer bound with an added service flow adopts a newly established bearer or adopts an existing bearer.

The first determining module 1242 is configured to determine, if the first judging module determines that the newly established bearer is adopted, an air interface transmission mode, which is allowed to be used by the added service flow, as an air interface transmission mode allowed to be used by the newly established bearer.

The second determining module 1243 is configured to determine, if the first judging module determines that the existing bearer is used, an air interface transmission mode, which is allowed to be used by all service flows bound with the existing bearer, as an air interface transmission mode allowed to be used by the existing bearer.

The second judging module 1244 is configured to judge whether a bearer bound with a deleted service flow is further bound with another service flow besides the deleted service flow.

The third determining module 1245 is configured to determine, if the bearer bound with the deleted service flow is further bound with the another service flow, an air interface transmission mode, which is allowed to be used by the another service flow, as an air interface transmission mode allowed to be used by the bearer bound with the deleted service flow.

The deleting module 1246 is configured to delete, if the bearer bound with the deleted service flow is not bound with the another service flow, the bearer bound with the deleted service flow.

The first sending unit 125 is configured to send a session establishment reply message to an SGW to which the mobile terminal belongs, where the session establishment reply message comprises the air interface transmission mode that is allowed to be used by the bearer and is determined by the determining unit, so that the SGW sends, through an MME to which the mobile terminal belongs, the air interface transmission mode allowed to be used by the bearer to a base station to which the mobile terminal belongs for data transmission.

Further, the air interface transmission mode that is allowed to be used by the bearer and is determined by the determining unit is at first sent by the first sending unit to the MME to which the mobile terminal belongs through the SGW, and then sent to the base station by sending, by the MME, a bearer establishment message or a bearer modification message to the base station, where the bearer establishment message or the bearer modification message includes the air interface transmission mode allowed to be used by the bearer.

The third receiving unit 126 is configured to receive a session establishment response message, where the session establishment response message comprises the air interface transmission mode determined by the determining unit for the bearer.

Further, the determined air interface transmission mode that is comprised in the session establishment response message received by the third receiving unit is at first sent to the MME through the base station, then sent to the SGW through the MME, and finally sent to the PGW by sending, by the SGW, the session establishment response message to the PGW, where the session establishment response message comprises the determined air interface transmission mode.

The third sending unit 127 is configured to send the determined air interface transmission mode received by the third receiving unit to the PCRF.

The third sending unit sends the determined air interface transmission mode received by the third receiving unit to the PCRF, so that the PCRF sends a charging rule of the determined air interface transmission mode to the PGW according to the determined air interface transmission mode.

The fourth receiving unit 128 is configured to receive the charging rule for the determined air interface transmission mode and sent by the PCRF.

The PCRF generates a different policy and charging rule for a corresponding mobile terminal according to the air interface transmission mode in the session establishment response message and in combination with a local charging policy setting, and sends the policy and charging rule to the PGW to which the mobile terminal belongs, and the fourth receiving unit receives the charging rule for the determined air interface transmission mode and sent by the PCRF, so that the PGW charges a corresponding bearer according to the policy and charging rule.

The charging unit 129 is configured to charge the bearer according to the charging rule received by the fourth receiving unit.

In the PGW provided by this embodiment, after the solution is used, the base station selects an appropriate air interface transmission mode for the bearer according to an air interface transmission mode allowed to be used by each bearer and then according to network load information corresponding to each air interface transmission mode, air interface link quality of each air interface transmission mode of the mobile terminal, and QoS of the bearer, thereby improving data transmission efficiency, and guaranteeing quality of service requirements of different service flows.

Figure 13:
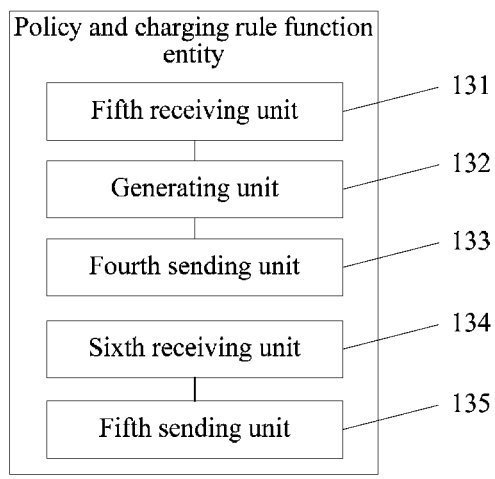
FIG. 13 is a schematic structural diagram of a policy and charging rule function entity according to an embodiment of the present invention.

This embodiment provides a PCRF, as shown in FIG. 13, including: a fifth receiving unit 131, a generating unit 132, a fourth sending unit 133, a sixth receiving unit 134, and a fifth sending unit 135.

In this embodiment, the fifth receiving unit 131, the generating unit 132, the fourth sending unit 133, the sixth receiving unit 134, and the fifth sending unit 135 include a PCRF in a core network.

The fifth receiving unit 131 is configured to receive a session establishment message sent by a PGW, where the session establishment message comprises indication information of an air interface transmission mode that is supported by a mobile terminal establishing a session.

The generating unit 132 is configured to generate an enhanced policy and charging control rule for a service flow of the mobile terminal according to the indication information that is received by the fifth receiving unit and a policy and charging setting that corresponds to the mobile terminal, where the enhanced policy and charging control rule comprises the service flow of the mobile terminal, and an air interface transmission mode allowed to be used by the service flow of the mobile terminal.

The fourth sending unit 133 is configured to send the enhanced policy and charging control rule generated by the generating unit to the PGW, so that the PGW determines, according to the indication information and the enhanced policy and charging control rule, an air interface transmission mode allowed to be used by a bearer bound with the service flow of the mobile terminal, and sends the air interface transmission mode allowed to be used by the bearer to a base station to which the mobile terminal belongs through an SGW to which the mobile terminal belongs and an MME to which the mobile terminal belongs for data transmission.

The sixth receiving unit 134 is configured to receive the air interface transmission mode that is determined for the bearer and is sent by the PGW.

The fifth sending unit 135 is configured to send a charging rule of the determined air interface transmission mode received by the sixth receiving unit to the PGW, so that the PGW charges the bearer according to the charging rule.

After the solution is adopted, the base station determines, according to information about an enhanced policy and charging control rule of each bearer, an air interface transmission mode available to a corresponding bearer, then selects the most matching air interface transmission mode for the bearer according to network load information that corresponds to each air interface transmission mode available to a bearer on an air interface, quality of an air interface link between the mobile terminal and a network that corresponds to each air interface transmission mode available to the bearer on the air interface, and QoS of the bearer, and sends information about the most matching air interface transmission mode selected for the bearer to the mobile terminal and the core network, the mobile terminal instructs a relevant bearer to transmit data in the most matching air interface transmission mode, and the core network performs special charging on the bearer according to a different air interface transmission mode, thereby improving the accuracy of air interface transmission modes selected by the base station for different bearers in different mobile terminals.

Figure 14:
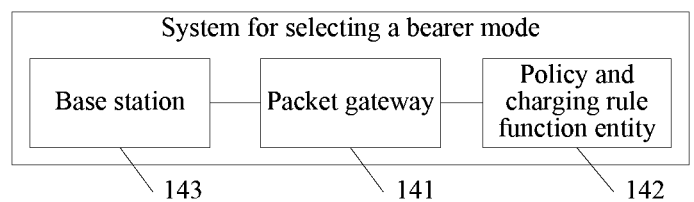
FIG. 14 is a schematic structural diagram of a system for selecting a bearer mode according to an embodiment of the present invention.

This embodiment provides a system for selecting a bearer mode, as shown in FIG. 14, including: a packet gateway 141, a policy and charging rule function entity 142, and a base station 143.

Specifically, the packet gateway 141 is configured to receive indication information of an air interface transmission mode supported by a mobile terminal; determine, according to the indication information and a received enhanced policy and charging control rule that is sent by a PCRF, an air interface transmission mode allowed to be used by a bearer bound with a service flow of the mobile terminal; and send a session establishment reply message to an SGW to which the mobile terminal belongs.

The enhanced policy and charging control rule comprises the service flow of the mobile terminal, and an air interface transmission mode allowed to be used by the service flow of the mobile terminal; and the session establishment reply message comprises the air interface transmission mode allowed to be used by the bearer.

The policy and charging rule function entity 142 is configured to receive a session establishment message; generate the enhanced policy and charging control rule for the service flow of the mobile terminal according to the indication information and a policy and charging setting that corresponds to the mobile terminal; and send the enhanced policy and charging control rule to the PGW.

The session establishment message comprises the indication information.

The base station 143 is configured to receive a bearer establishment message or a bearer modification message sent by the PGW through the SGW and an MME to which the mobile terminal belongs, where the bearer establishment message or the bearer modification message comprises air interface transmission modes allowed to be used by a bearer; and determine an air interface transmission mode, in the air interface transmission mode allowed to be used by the bearer, which satisfies a quality of service requirement of the bearer and has the best air interface link quality of each air interface transmission mode of the mobile terminal, as an air interface transmission mode of the bearer, and configure the bearer to transmit data in the determined air interface transmission mode.

After the solution is adopted, the base station determines, according to information about an enhanced policy and charging control rule of each bearer, an air interface transmission mode available to a corresponding bearer, then selects the most matching air interface transmission mode for the bearer according to network load information that corresponds to each air interface transmission mode available to a bearer on an air interface, quality of an air interface link between the mobile terminal and a network that corresponds to each air interface transmission mode available to the bearer on the air interface, and QoS of the bearer, and sends information about the most matching air interface transmission mode selected for the bearer to the mobile terminal and the core network, the mobile terminal instructs a relevant bearer to transmit data in the most matching air interface transmission mode, and the core network performs special charging on the bearer according to a different air interface transmission mode, thereby improving the accuracy of air interface transmission modes selected by the base station for different bearers in different mobile terminals.

According to the descriptions of the preceding embodiments, persons skilled in the art may clearly understand that the present invention may be implemented by hardware only or by software and necessary universal hardware. However, in most cases, using software and a necessary universal hardware platform are preferred. Based on such an understanding, the technical solutions of the present invention essentially, or the part contributing to the prior art may be implemented in the form of a software product. The computer software product is stored in a readable storage medium, for example, a floppy disk, a hard disk, or an optical disk of the computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention is subject to the protection scope of the appended claims.

What is claimed is:

1. A method for selecting a bearer mode, comprising:
receiving, by a packet gateway in a core network, indication information from a mobile terminal, wherein the indication information includes air interface transmission modes supported by the mobile terminal for establishing a session with the core network;
receiving an enhanced policy and charging control rule (PCC rule) sent by a policy and charging rule function (PCRF) entity in the core network, wherein the enhanced PCC rule comprises: (a) at least one service flow of the mobile terminal, and (b) an air interface transmission mode associated with each service flow of the mobile terminal;
determining, according to the indication information and the enhanced PCC rule, an appropriate air interface transmission mode allowed to be used by one of a plurality of bearers of the mobile terminal, wherein each bearer is bound with one or more of the at least one service flow of the mobile terminal; and
sending a session establishment reply message to a serving gateway to which the mobile terminal belongs, wherein the session establishment reply message comprises the determined appropriate air interface transmission mode allowed to be used by the bearer.

2. The method according to claim 1, wherein before the receiving the enhanced PCC rule sent by the PCRF entity, the method further comprises:
sending a session establishment message to the PCRF entity, wherein the session establishment message comprises the indication information, and the indication information is used for the PCRF entity to generate, the enhanced PCC rule for the at least one service flow of the mobile terminal, according to the indication information and a policy and charging setting that corresponds to the mobile terminal.

3. The method according to claim 1, wherein if the at least one service flow of the mobile terminal comprised in the enhanced PCC rule is a newly added service flow of the mobile terminal, the determining the appropriate air interface transmission mode allowed to be used by the bearer comprises:
judging whether the bearer bound with the newly added service flow is a newly established bearer or an existing bearer;
if the bearer bound with the newly added service flow is the newly established bearer, determining an air interface transmission mode, which is allowed to be used by the newly added service flow, as the appropriate air interface transmission mode allowed to be used by the bearer bound with the newly added service flow; or
if the bearer bound with the newly added service flow is the existing bearer, determining an air interface transmission mode, which is allowed to be used by all service flows bound with the existing bearer, as the appropriate air interface transmission mode allowed to be used by the bearer bound with the newly added service flow.

4. The method according to claim 1, wherein if the at least one service flow of the mobile terminal comprised in the enhanced PCC rule is a deleted service flow, the determining the appropriate air interface transmission mode allowed to be used by the bearer comprises:
judging whether the bearer bound with the deleted service flow is further bounded with another service flow besides the deleted service flow; and
if the bearer bound with the deleted service flow is further bound with the another service flow, determining an air interface transmission mode, which is allowed to be used by the another service flow, as the appropriate air interface transmission mode allowed to be used by the bearer bound with the deleted service flow.

5. The method according to claim 4, wherein the determining the appropriate air interface transmission mode allowed to be used by the bearer further comprises:
if the bearer bound with the deleted service flow is not bound with the another service flow, deleting the bearer bound with the deleted service flow.

6. The method according to claim 1, wherein
the appropriate air interface transmission mode allowed to be used by the bearer is sent from a mobility management entity (MME) to a base station (BS) using a bearer establishment message or a bearer modification message.

7. The method according to claim 1, wherein after the sending the session establishment reply message to the serving gateway to which the mobile terminal belongs, the method further comprises:
receiving a session establishment response message, wherein the session establishment response message comprises the appropriate air interface transmission mode determined for the bearer;
sending the determined appropriate air interface transmission mode to the PCRF entity;
receiving a charging rule sent by the PCRF entity, wherein the charging rule is for the determined appropriate air interface transmission mode; and
charging the bearer according to the charging rule.

8. The method according to claim 7, wherein the determined appropriate air interface transmission mode comprised in the session establishment response message is received by the packet gateway from the serving gateway using the session establishment response message, and the determined appropriate air interface transmission mode is sent by the base station to the packet gateway via the MME and the serving gateway.

9. A method for selecting a bearer mode, comprising:
receiving, by a policy and charging rule function (PCRF) entity in a core network, a session establishment message sent by a packet gateway in the core network, wherein the session establishment message comprises indication information sent from a mobile terminal, wherein the indication information includes air interface transmission modes supported by the mobile terminal for establishing a session with the core network;

generating an enhanced PCC rule for at least one service flow of the mobile terminal according to the indication information and a policy and charging setting that corresponds to the mobile terminal, wherein the enhanced PCC rule comprises; (a) the at least one service flow of the mobile terminal, and (b) an air interface transmission mode associated with each service flow of the mobile terminal; and sending the enhanced PCC rule to the packet gateway, wherein the enhanced PCC rule is used for the packet gateway to determine, according to the indication information and the enhanced PCC rule, an appropriate air interface transmission mode allowed to be used by one of a plurality of bearers bound with the at least one service flow of the mobile terminal, wherein each bear of the mobile terminal is bound with one or more of the at least one service flow.

10. The method according to claim 9, wherein after the sending the enhanced PCC rule to the packet gateway, the method further comprises:

receiving the appropriate air interface transmission mode that is determined for the bearer and is sent by the packet gateway; and sending a charging rule of the determined appropriate air interface transmission mode to the packet gateway, to enable the packet gateway to charge the bearer according to the charging rule.

11. A packet gateway, comprising:

a first receiving unit, configured to receive indication information from a mobile terminal, wherein the indication information comprises air interface transmission modes supported by the mobile terminal for establishing a session with a core network to which the packet gateway belongs;

a second receiving unit, configured to receive an enhanced policy and charging control rule (PCC rule) sent by a policy and charging rule function (PCRF) entity in the core network, wherein the enhanced PCC rule comprises: (a) at least one service flow of the mobile terminal, and (b) an air interface transmission mode associated with each service flow of the mobile terminal;

a determining unit, configured to determine, according to the indication information and the enhanced PCC rule, an appropriate air interface transmission mode allowed to be used by one of a plurality of bearers of the mobile terminal, wherein each bearer is bound with one or more of the at least one service flow of the mobile terminal; and a first sending unit, configured to send a session establishment reply message to a serving gateway to which the mobile terminal belongs, wherein the session establishment reply message comprises the determined appropriate air interface transmission mode allowed to be used by the bearer.

12. The packet gateway according to claim 11, further comprising:

a second sending unit, configured to send a session establishment message to the PCRF entity, wherein the session establishment message comprises the indication information received by the first receiving unit, and the indication information is used for the PCRF entity to generate the enhanced PCC rule for the at least one service flow of the mobile terminal, according to the indication information and a policy and charging setting that corresponds to the mobile terminal.

13. The packet gateway according to claim 11, wherein the determining unit comprises a first judging module, a first determining module and a second determining module;

wherein if the at least one service flow of the mobile terminal comprised in the enhanced PCC rule is a newly added service flow of the mobile terminal, the first judging module is configured to judge whether the bearer bound with the newly added service flow is a newly established bearer or an existing bearer;

the first determining module is configured to, if the first judging module determines that the bearer bound with the newly added service flow is the newly established bearer, determine an air interface transmission mode, which is allowed to be used by the newly added service flow, as the appropriate air interface transmission mode allowed to be used by the bearer bound with the newly added service flow; and the second determining module is configured to, if the first judging module determines that the bearer bound with the existing service flow is the existing bearer, determine an air interface transmission mode, which is allowed to be used by all service flows bound with the existing bearer, as the appropriate air interface transmission mode allowed to be used by the bearer bound with the newly added service flow.

14. The packet gateway according to claim 11, wherein the determining unit comprises a second judging module, a third determining module and a deleting module;

wherein if the at least one service flow of the mobile terminal comprised in the enhanced PCC rule is a deleted service flow, the second judging module is configured to judge whether the bearer bound with the deleted service flow is further bound with another service flow besides the deleted service flow;

the third determining module is configured to, if the second judging module that the bearer bound with the deleted service flow is further bound with the another service flow, determine an air interface transmission mode, which is allowed to be used by the another service flow, as the appropriate air interface transmission mode allowed to be used by the bearer bound with the deleted service flow; and the deleting module is configured to, if the second judging module that the bearer bound with the deleted service flow is not bound with the another service flow, delete the bearer bound with the deleted service flow.

15. The packet gateway according to claim 11, wherein the appropriate air interface transmission mode allowed to be used by the bearer is sent to a base station (BS) using a bearer establishment message or a bearer modification message.

16. The packet gateway according to claim 11, further comprising:

a third receiving unit, configured to receive a session establishment response message, wherein the session establishment response message comprises the appropriate air interface transmission mode determined for the bearer;

a third sending unit, configured to send the determined appropriate air interface transmission mode received by the third receiving unit to the PCRF entity;

a fourth receiving unit, configured to receive a charging rule sent by the PCRF entity, wherein the charging rule is for the determined appropriate air interface transmission mode; and a charging unit, configured to charge the bearer according to the charging rule received by the fourth receiving unit.

17. The packet gateway according to claim 16, wherein the determined appropriate air interface transmission mode is received by the packet gateway from the serving gateway using the session establishment response message, and the determined appropriate air interface transmission mode is sent by a base station (BS) to the packet gateway via a mobility management entity (MME) and the serving gateway.

18. A policy and charging rule function entity, comprising:

a first receiving unit, configured to receive a session establishment message sent by a packet gateway in a core network, wherein the session establishment message comprises indication information received from a mobile terminal, wherein the indication information includes air interface transmission modes supported by the mobile terminal for establishing a session with the core network;

a generating unit, configured to generate an enhanced policy and charging control (PCC) rule for at least one service flow of the mobile terminal according to the indication information and a policy and charging setting that corresponds to the mobile terminal, wherein the enhanced PCC rule comprises (a) the at least one service flow of the mobile terminal, and (b) an air interface transmission mode allowed to be used by each service flow of the mobile terminal; and a first sending unit, configured to send the enhanced PCC rule generated by the generating unit to the packet gateway, wherein the enhanced PCC rule is used for the packet gateway to determine, an appropriate air interface transmission mode allowed to be used by one of a plurality of bearers of the mobile terminal, wherein each bearer is bound with one or more of the at least one service flow of the mobile terminal, according to the indication information and the enhanced PCC rule.

19. The policy and charging rule function entity according to claim 18, further comprising:

a second receiving unit, configured to receive the appropriate air interface transmission mode that is determined for the bearer and is sent by the packet gateway; and a second sending unit, configured to send a charging rule of the determined appropriate air interface transmission mode to the packet gateway, to enable the packet gateway to charge the bearer according to the charging rule.

20. The method according to claim 1, wherein the appropriate air interface transmission mode is a $3^{rd}$ Generation Partnership Project (3GPP) mode, a wireless fidelity (Wi-Fi) mode, or a Long Term Evolution (LTE)/Wi-Fi hybrid mode.

* * * * *